Figure 3:
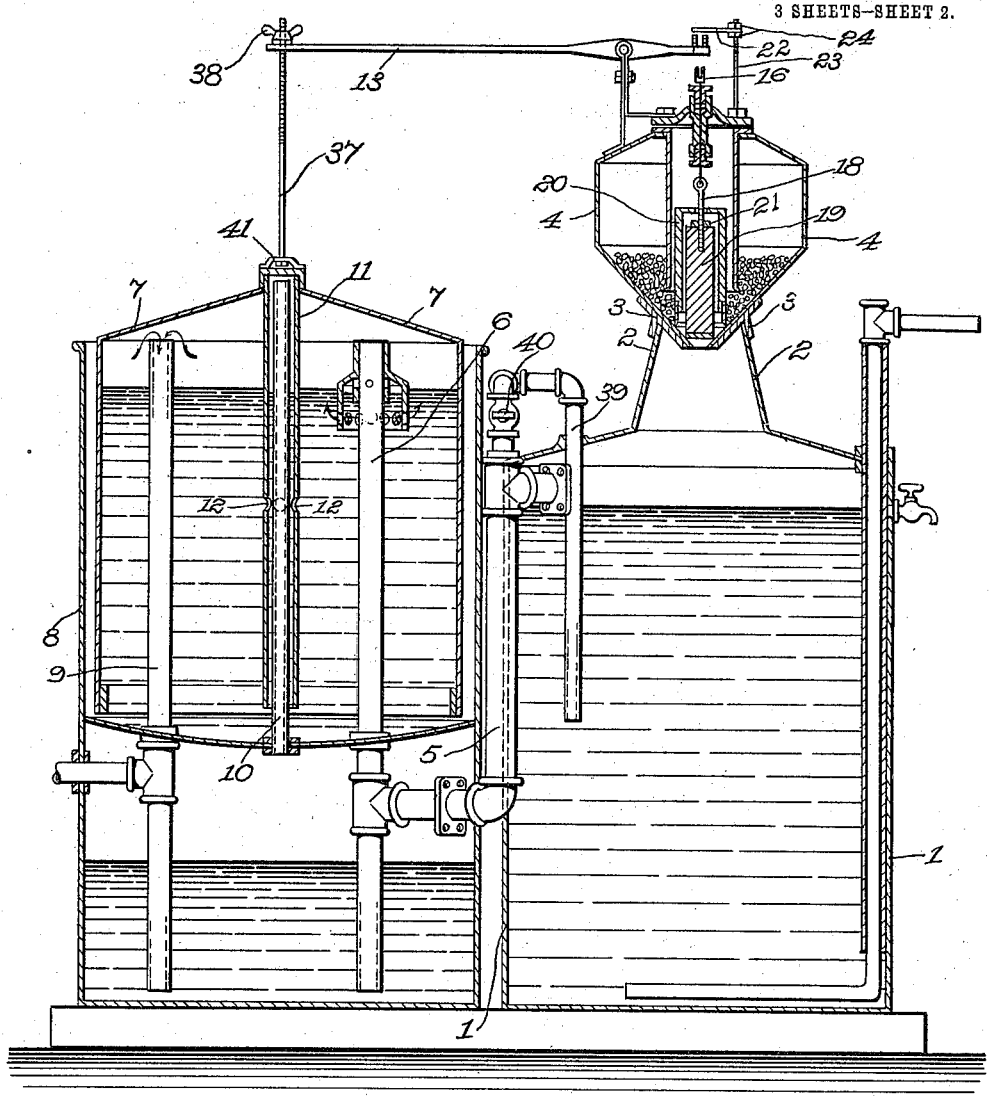

J. KILBURN, J. W. FAIRLEY, T. B. KIDNER, W. H. IRVINE & W. T. CHESTNUT.
ACETYLENE GAS GENERATOR.
APPLICATION FILED SEPT. 28, 1911.
1,029,874.
Patented June 18, 1912.
3 SHEETS—SHEET 1.
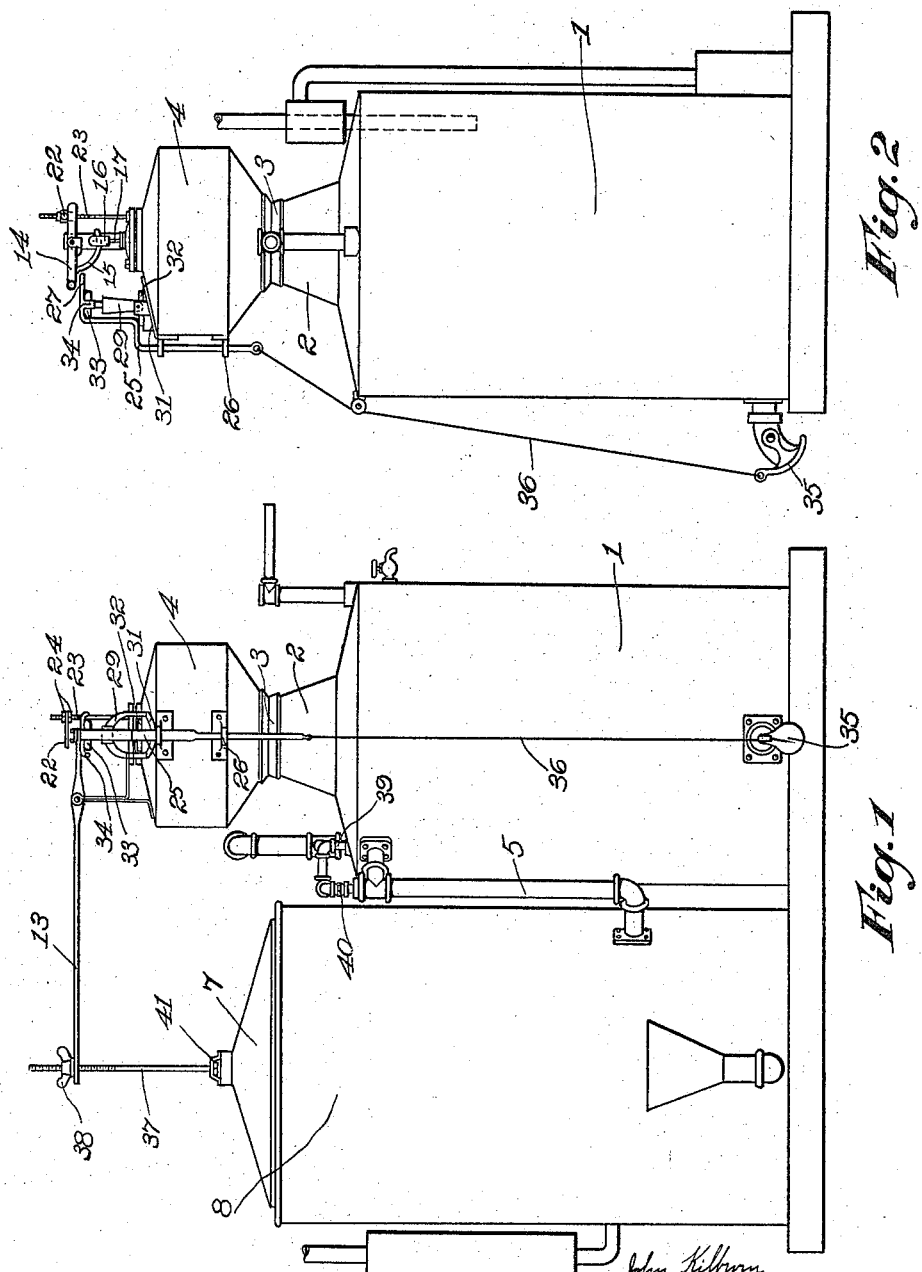

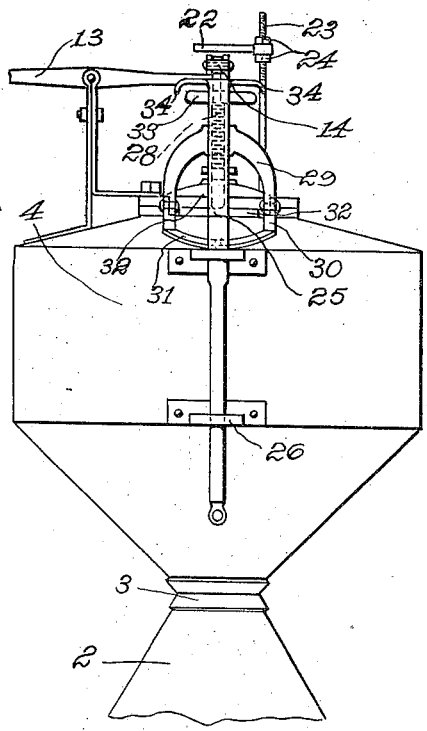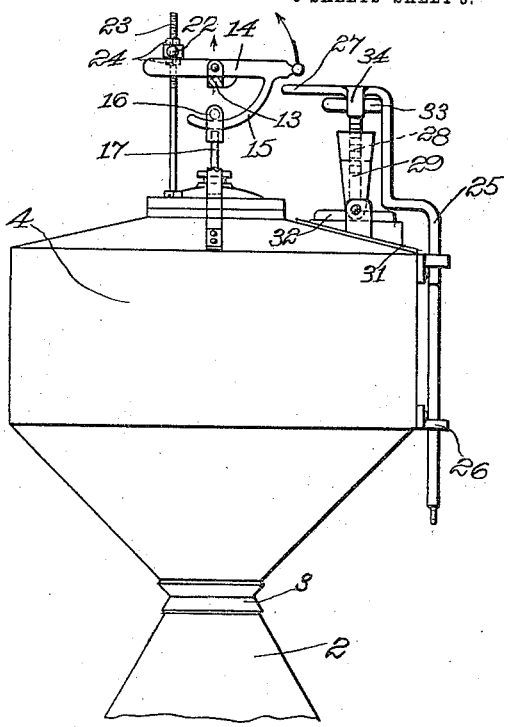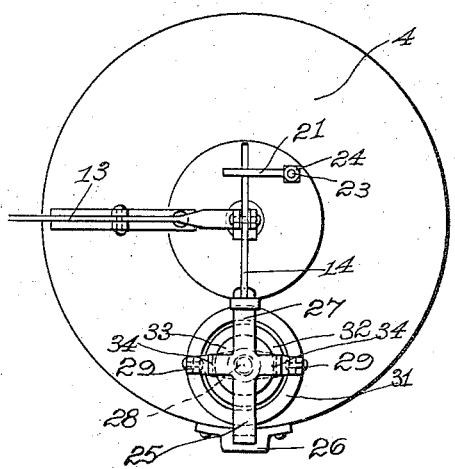

UNITED STATES PATENT OFFICE.

JOHN KILBURN, JOHN WESLEY FAIRLEY, THOMAS BESSELL KIDNER, WILLIAM HERBERT IRVINE, AND WILLIAM TURNBULL CHESTNUT, OF FREDERICTON, NEW BRUNSWICK, CANADA, ASSIGNORS TO MONITOR GAS GENERATOR COMPANY, OF NEW YORK, N. Y., A CORPORATION OF NEW YORK.

ACETYLENE-GAS GENERATOR.

1,029,874.   Specification of Letters Patent.   Patented June 18, 1912.

Application filed September 28, 1911. Serial No. 651,792.

*To all whom it may concern:*

Be it known that we, JOHN KILBURN, JOHN WESLEY FAIRLEY, THOMAS BESSELL KIDNER, WILLIAM HERBERT IRVINE, and WILLIAM TURNBULL CHESTNUT, all subjects of the King of Great Britain, and residing at Fredericton, in the Province of New Brunswick, Canada, have invented certain new and useful Improvements in Acetylene-Gas Generators; and we do hereby declare that the following is a full, clear, and exact description of the invention, such as will enable others skilled in the art to which it appertains to make and use the same.

The invention to be hereinafter described relates to gas generators and particularly to acetylene gas generators of the inverted bell variety.

Broadly speaking it comprises a generating tank, a carbid chamber communicating therewith, valves for cutting off communication between the carbid tank and generating chamber, a gas tank communicating with the generating tank, a bell movably mounted in the gas tank, a safety gas escape or blow-off provided in the gas tank, a lever pivotally mounted on the carbid chamber, adjustable connections between the bell and lever, adjustable connections between the valves and lever, means for removing the waste material from the generating tank, means for automatically operating the waste removing means and disconnecting the valves from the lever, means for protecting the lower end of the carbid chamber, and means for permitting escape of air and gas from the generating tank during charging.

In order to more clearly disclose the construction, operation and use of the invention, reference should be had to the accompanying drawings forming part of the present application.

Throughout the several figures of the drawings like reference characters designate the same parts.

In the drawings: Figure 1 is a side elevation of the generator, complete; Fig. 2 is a right hand end view of Fig. 1; Fig. 3 is a vertical longitudinal section of the complete generator; Fig. 4 is an enlarged side elevation of the carbid chamber and attachments, as shown in Fig. 1; Fig. 5 is a view similar to Fig. 4, looking toward the right of Fig. 1. Fig. 6 is a top plan view of Fig. 4. Fig. 7 is a front view of the closure retaining device, and Fig. 8 is a side elevation of the same.

Referring to the drawings in detail, 1 indicates a gas generating tank provided with an upwardly extending neck 2 adapted to loosely receive a removable cast iron collar 3 in which is seated the lower tapered delivery end of the carbid receptacle 4. The collar 3 forms a strong rigid support for the carbid receptacle and, at the same time, provides a very adequate guard for the upper end of the neck 2 and the lower end of the carbid receptacle. The upper part of this generating tank is connected by an elbow-pipe 5 with a vertical gas delivery pipe 6 which is adapted to deliver the gas to the interior of a bell 7 slidably mounted in the gas tank 8. Gas may be drawn from the gas tank through the pipe 9, in the usual manner. Centrally arranged within the chamber 8 is a hollow guide tube or pipe 10 adapted to fit loosely within a similar tube 11 extending downwardly from the top of the bell. The tube 11 is provided with a plurality of perforations 12 arranged at a predetermined point below the top of the bell. When the gas beneath the bell forces it upward to such a point that the perforations 12 come above the surface of the water, the excess gas will escape through the perforations and out through the tube 10 to the lower compartment of the tank 8. In this way, the gas bell cannot be raised, by the gas beyond a predetermined point.

In order to cut off the generation of gas at the proper time, it is necessary to stop the feed of carbid to the generating tank. For this purpose, an operating lever 13 has been provided. This lever is pivotally mounted on the top of the carbid tank. Pivotally mounted in the end of the short arm of the operating lever, is an arm 14, extending at right angles to the lever and weighted at its end away from the same. This arm is provided with a curved depending finger or hook 15 adapted to act as a cam for raising and lowering the valves controlling the feed of carbid. Slidably mounted on the finger 15 is a small yoke 16 connected to the upper end of the valve rod 17. The lower end of this valve rod is connected to the eye of a bolt 18 provided with screw threads. A weighted rubber faced plug valve 19 is screwed to the lower end of the bolt and adapted to close the feed opening of the bottom of the carbid receptacle. Disposed about this plug valve and slidably mounted on the bolt 18, is a weighted cylindrical supplemental valve 20 which is raised from its seat by engagement with a nut 21 adjustably threaded on the bolt 18 about the top of the plug valve 19. According to this arrangement, the valve 19 will be raised from its seat before the nut 21 engages and raises the supplemental valve 20. In closing or shutting off the feed of the carbid, the supplemental valve 20 will reach its seat first, and then the valve 19 will reach its seat. In this way, a clean seat is always assured for the valve 19. By adjusting the nut 21, the time of seating of the valves, relatively to each other, may be accurately regulated for varieties of the sizes or grades of carbid.

Should the supply of carbid in the receptacle 4 become exhausted and all the gas in the bell 7 be used, it is advisable, of course, to close the delivery opening of the carbid receptacle, by seating the valves. This is done automatically by an arm 22 adjustably mounted on a post 23 extending upwardly from the receptacle 4 adjacent the opening for the passage of valve rod 17. This arm is held in adjusted position by means of nuts 24 and is adapted to engage one end of the weighted arm 14. As the bell 7 falls, the arm 14 will rise. As the arm 14 rises, it will be caught by the arm 22 and swung to position to free the yoke 16 from the hook 15, thus allowing the valves to be seated so that the delivery opening will be closed and no moisture will be permitted to enter the carbid receptacle. By adjusting the arm 22 on its post 23, operation of the closing valves may be effected at any predetermined moment.

It is necessary, of course, to close the valves while charging the carbid receptacle. For this purpose, an angle bar 25 has been provided. This bar is adapted to slide in keepers 26 on the wall of the carbid receptacle and is formed to overlie the closure sealing device, so that raising of the sealing device will also cause raising of the angle bar. The angle bar is provided with a short branch 27 which underlies the weighted end of the arm 14. As the angle bar is raised it will engage the arm 14 and rock the arm to free the yoke 16 from its hook 15, thereby allowing the valves to seat. The closure sealing device comprises a screw 28 threaded through a yoke 29 pivotally mounted in ears 30 projecting upwardly from a plate 31 secured around the filling opening which is provided with a disk or plate closure 32 having the usual rubber packing. The upper end of the screw is provided with a small hand wheel 33 by which it may be turned to tighten the closure 32. The short branch 27 of the angle bar 25 is provided with projecting, inwardly curved, fingers 34 adapted to be engaged by the hand wheel 33 when it is turned to free the closure disk 32 for its removal. Engagement between the fingers 34, or short branch 27, and the hand wheel 33, during such rotation of the hand wheel, effects raising of the angle bar, with results just stated.

An angle cock 35 is connected by a chain 36, or the like, to the lower end of the angle bar. Consequently, raising of the angle bar, causes opening of the angle cock and discharge of the contents of the generating tank. Consequently, it is impossible to open the filling opening of the carbid receptacle without, at the same time, opening the angle cock, and discharging the contents of the generating tank. This, of course, necessitates and insures a clean supply of water in the generating tank every time that the carbid receptacle is filled.

In order to further add to the accuracy and perfection of the generator, the connection between the lever 13 and the top of the bell 7, is made adjustable. This connection comprises a threaded rod 37 adapted to pass loosely through the end of the lever and a winged thumb nut 38 adapted to be screwed down on the rod to engage the lever end. The long arm of lever 13 of course rises and falls with the bell.

Air and remaining gas in the generating tank escape therefrom by means of an escape pipe 39 when the chamber or tank is being filled with water. This pipe is also connected to the pipe 5 so that excess gas in the bell 7 may also escape therethrough, if desired. The connection is controlled by a turn plug 40 which is normally closed.

On referring to Fig. 3, it will be seen that the rod 37 is not connected direct to the bell 7 but, instead, to a small metal strip or strap 41. This strap is soldered to the top of the bell by a solder which will melt at 300° of heat Fahrenheit, thereby allowing the long arm of the lever 13 to swing upwardly, with consequent closing of the valves 19 and 20 and the prevention of further generation of gas.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described our invention, what we claim as new and desire to secure by Letters Patent is.

1. In combination with a carbid receptacle and a generating chamber supplied thereby, a valve for cutting off said supply, a lever, a gas-bell with which the long arm of said lever moves up and down, an arm pivoted on said lever and provided with a valve-suspending hook extending under it, a yoke, attached to and moving with said valve, which receives the end of said hook for the suspension of said valve, but allows the withdrawal of said hook to free said valve for falling and closing and relatively fixed adjustable means arranged to be engaged by the said arm to automatically withdraw said hook as said arm rises.

2. In combination with a carbid receptacle and a generating chamber supplied thereby, a valve for cutting off said supply, a lever, a gas bell acting on one arm of said lever to lower it by the descent of said bell, an arm pivoted on the other arm of said lever and provided with a valve-suspending hook, a yoke attached to said valve and receiving said hook, but permitting the withdrawal of the latter by the rocking of said pivoted arm and a device arranged to engage and rock the latter as the shorter end of said lever rises by the descent of the bell.

3. A generator of the character described comprising a generating chamber, a carbid receptacle mounted above the generating chamber and adapted to deliver carbid thereto, valves for controlling the delivery of carbid, a gas chamber, a gas bell movably mounted therein, means for delivering gas from the generating chamber to the gas chamber, a lever mounted on said carbid receptacle, connections between said lever and said gas bell an arm pivotally mounted on said lever, separable connections between said arm and the aforesaid valves, a filling-opening closure for said carbid receptacle, means for forcing the closure to operative position, and an angle bar actuated by said means and adapted to engage and operate said arm to separate said connections.

In witness whereof we have hereunto set our hands in the presence of two witnesses.

JOHN KILBURN.
JOHN WESLEY FAIRLEY.
THOMAS BESSELL KIDNER.
WILLIAM HERBERT IRVINE.
WILLIAM TURNBULL CHESTNUT.

Witnesses as to the signatures of John Kilburn, John Wesley Fairley, William Herbert Irvine, and William Turnbull Chestnut.

B. NICHOLS,
W. L. GUNTEN.

Witnesses as to the signature of T. B. Kidner:

E. S. HOTCHKISS,
H. KAVANER.

---

Copies of this patent may be obtained for five cents each, by addressing the "Commissioner of Patents, Washington, D. C."